United States Patent
Ichiba et al.

(10) Patent No.: US 12,025,069 B2
(45) Date of Patent: Jul. 2, 2024

(54) HYBRID VEHICLE CONTROL METHOD AND HYBRID VEHICLE CONTROL DEVICE

(71) Applicant: Nissan Motor Co., Ltd., Yokohama (JP)

(72) Inventors: Tsukasa Ichiba, Kanagawa (JP); Makoto Kozuka, Kanagawa (JP); Tomohiro Ito, Kanagawa (JP); Azusa Kobayashi, Kanagawa (JP); Kenichi Goto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 285 days.

(21) Appl. No.: 17/628,245

(22) PCT Filed: Dec. 6, 2019

(86) PCT No.: PCT/JP2019/047958
§ 371 (c)(1),
(2) Date: Jan. 19, 2022

(87) PCT Pub. No.: WO2021/111637
PCT Pub. Date: Jun. 10, 2021

(65) Prior Publication Data
US 2022/0258720 A1    Aug. 18, 2022

(51) Int. Cl.
*B60W 10/08*    (2006.01)
*F02D 41/02*    (2006.01)

(52) U.S. Cl.
CPC ... *F02D 41/021* (2013.01); *B60W 2510/0638* (2013.01); *B60W 2510/0676* (2013.01);
(Continued)

(58) Field of Classification Search
CPC ...... B60W 20/17; B60W 10/06; B60W 10/08; B60W 10/18; B60W 2510/0638;
(Continued)

(56) References Cited

U.S. PATENT DOCUMENTS 5,846,164 A * 12/1998 Harada .................. F02D 41/32
303/114.3
5,915,357 A *  6/1999 Harada .................... F02D 9/02
477/203
(Continued)

FOREIGN PATENT DOCUMENTS

CN    102822500 A  * 12/2012   .......... F02N 11/0822
CN    102822500 B  *  1/2014   .......... F02N 11/0822
(Continued)

OTHER PUBLICATIONS

"Control, Alarm and Indicator Systems in Modern Electric Vehicles;" Sharma et al., 2006 IEEE Conference on Electric and Hybrid Vehicles (pp. 1-5), Jul. 23, 2007. (Year: 2007).*
(Continued)

*Primary Examiner* — Khoi H Tran
*Assistant Examiner* — Jorge O Peche
(74) *Attorney, Agent, or Firm* — Global IP Counselors, LLP (57) ABSTRACT

A hybrid control method controls a hybrid vehicle. A control unit sets a rotational speed threshold value at which a continuous gear tooth striking sound occurring in a gear mechanism connecting an electric power generation motor to the internal combustion engine is not a problem in terms of vehicle quality. The control unit generates negative pressure while maintaining the engine rotational speed in the firing state where the engine rotational speed is equal to or greater than the rotational speed threshold value. Also, the control unit generates negative pressure after switching from the firing state to a motoring state where the internal combustion engine is rotated by the electric power generation motor and where the engine rotational speed is less than the rotational speed threshold value.

7 Claims, 11 Drawing Sheets

(52) U.S. Cl.
CPC ............... *B60W 2710/0644* (2013.01); *B60W 2710/0666* (2013.01); *B60W 2710/08* (2013.01); *F02D 2200/101* (2013.01)

(58) Field of Classification Search
CPC . B60W 2510/0676; B60W 2710/0644; B60W 2710/0666; B60W 2710/08; F02D 2200/025; F02D 2250/41; Y02T 10/62
See application file for complete search history.

(56) References Cited

U.S. PATENT DOCUMENTS

| | | | | |
|---|---|---|---|---|
| 6,006,716 | A * | 12/1999 | Harada | F02D 41/3076 123/305 |
| 6,223,716 | B1 * | 5/2001 | Kadota | F02D 41/3076 123/295 |
| 6,321,716 | B1 * | 11/2001 | Mashiki | B60T 13/72 123/295 |
| 6,412,455 | B1 * | 7/2002 | Ogiso | F02D 13/0253 123/90.11 |
| 6,621,175 | B1 * | 9/2003 | Kuroda | B60W 10/06 903/905 |
| 8,554,453 | B2 * | 10/2013 | Moriya | F02N 11/0844 701/113 |
| 9,664,120 | B2 * | 5/2017 | Murata | F02D 13/023 |
| 9,669,825 | B1 * | 6/2017 | Dudar | F01M 13/022 |
| 2003/0004635 | A1 * | 1/2003 | Kamiya | F02N 11/0837 477/203 |
| 2003/0104904 | A1 * | 6/2003 | Ogawa | B60T 13/72 477/183 |
| 2003/0106728 | A1 * | 6/2003 | Kitajima | F02M 26/49 903/905 |
| 2004/0147364 | A1 * | 7/2004 | Wakashiro | F02D 17/02 477/109 |
| 2006/0180363 | A1 * | 8/2006 | Uchisasai | B60K 6/48 180/65.275 |
| 2007/0029122 | A1 * | 2/2007 | Suzuki | B60W 10/06 180/65.28 |
| 2007/0267232 | A1 * | 11/2007 | Saito | F02M 25/0827 73/114.38 |
| 2009/0018754 | A1 * | 1/2009 | Hano | F02D 41/0002 123/184.53 |
| 2009/0230761 | A1 * | 9/2009 | Sekiguchi | F01L 13/0026 303/2 |
| 2010/0004844 | A1 * | 1/2010 | Hirooka | F02P 5/1506 701/102 |
| 2011/0197860 | A1 * | 8/2011 | Aso | F02D 41/047 123/491 |
| 2012/0318232 | A1 * | 12/2012 | Miyasaka | F02D 13/08 123/198 R |
| 2013/0139775 | A1 * | 6/2013 | Moriya | F02N 11/0844 701/113 |
| 2013/0244834 | A1 * | 9/2013 | Tsumori | B60T 17/02 477/203 |
| 2016/0229391 | A1 * | 8/2016 | Shigemoto | B60W 20/14 |
| 2016/0297443 | A1 * | 10/2016 | Kato | B60T 7/122 |
| 2018/0080425 | A1 * | 3/2018 | Ose | F02N 5/04 |
| 2019/0293035 | A1 * | 9/2019 | Miyashita | F02M 35/10255 |
| 2022/0258720 | A1 * | 8/2022 | Ichiba | F02D 41/021 |
| 2022/0289170 | A1 * | 9/2022 | Hoshi | F02D 41/0245 |
| 2023/0271598 | A1 * | 8/2023 | Onogawa | B60K 6/46 701/22 |
| 2023/0339452 | A1 * | 10/2023 | Hoshi | B60W 20/11 |

FOREIGN PATENT DOCUMENTS

| | | | | |
|---|---|---|---|---|
| EP | 4071018 | B1 * | 8/2023 | ............ B60K 6/46 |
| JP | H08317507 | A * | 11/1996 | |
| JP | 2000120455 | A | 4/2000 | ............ B60K 6/543 |
| JP | 2003129880 | A * | 5/2003 | |
| JP | 2005076776 | A * | 3/2005 | |
| JP | 2007137375 | A * | 6/2007 | |
| JP | 2007-176418 | A | 7/2007 | |
| JP | 2009090909 | A * | 4/2009 | ............ B60K 6/365 |
| JP | 2009-137405 | A | 6/2009 | |
| JP | 2016-83988 | A | 5/2016 | |
| JP | 2016-120751 | A | 7/2016 | |
| JP | 2018-17212 | A | 2/2018 | |
| KR | 20060020000 | A * | 3/2006 | |
| WO | 2011/155024 | A1 | 12/2011 | |
| WO | WO-2012131942 | A1 * | 10/2012 | .......... F02N 11/0844 |
| WO | WO-2013161025 | A1 * | 10/2013 | ............ B60K 6/445 |
| WO | 2018/047224 | A1 | 3/2018 | |
| WO | WO-2018047224 | A1 * | 3/2018 | ............... B60K 6/20 |
| WO | WO-2021111637 | A1 * | 6/2021 | ............... B60K 6/46 |

OTHER PUBLICATIONS

"Toyota's newly developed hybrid powertrain;" Sasaki et al., Proceedings of the 10th International Symposium on Power Semiconductor Devices and ICs. ISPSD'98 (IEEE Cat. No. 98CH36212) (pp. 17-22); Jan. 1, 1998. (Year: 1998).*

"Regenerative braking system for a hybrid electric vehicle;" Cikanek et al., Proceedings of the 2002 American Control Conference (IEEE Cat. No. CH37301) (vol. 4, pp. 3129-3134 vol. 4); Jan. 1, 2002. (Year: 2002).*

* cited by examiner

| CONDITIONS | | | NEGATIVE PRESSURE GENERATION METHOD |
|---|---|---|---|
| ENGINE STATE | ROTATIONAL SPEED | ENVIRONMENT | |
| POWER GENERATION | EQUAL TO OR GREATER THAN THRESHOLD VALUE | GENERATING NECESSARY NEGATIVE PRESSURE IS POSSIBLE | COMBUSTION |
| | | GENERATING NECESSARY NEGATIVE PRESSURE IS NOT POSSIBLE | MOTORING |
| | LESS THAN THRESHOLD VALUE | – | MOTORING |
| MOTORING | – | – | MOTORING |
| STOPPING | – | – | MOTORING |

HYBRID VEHICLE CONTROL METHOD AND HYBRID VEHICLE CONTROL DEVICE

CROSS-REFERENCE TO RELATED APPLICATIONS

This application is a U.S. national stage application of International Application No. PCT/JP2019/047958, filed on Dec. 6, 2019.

BACKGROUND

Technical Field

The present invention relates to controlling a hybrid vehicle.

Background Information

There are known hybrid vehicles in which an electric power generation motor that functions as an electric motor and an electric power generator is connected to an internal combustion engine via a gear mechanism. It is known that in such hybrid vehicles, when torque of the electric power generation motor (motor torque) is near zero (Nm), torque fluctuation in the internal combustion engine is transmitted to the gear mechanism, whereby meshing parts of gears collide with each other during backlash, causing continuous gear tooth striking sound and other unusual sounds. JP 2016-120751 A discloses an invention in which in order to avoid the occurrence of these noises, a motor torque restricted range is provided, which is centered around a predetermined value near zero (Nm), and motor torque is controlled so as to avoid this restricted range.

SUMMARY

Also known are booster devices that provide assistance (i.e., amplification of depressing force on a brake pedal) utilizing intake negative pressure of the internal combustion engine during brake actuation. In the hybrid vehicle described above, when negative pressure for brake actuation is generated from a state in which the electric power generation motor is driven by the internal combustion engine to generate power, the torque of the internal combustion engine (also referred to as engine torque) must be reduced, and the motor torque must also be reduced accordingly.

However, in the control in the abovementioned document, the motor torque is controlled so as to not enter the restricted range. When the motor torque is controlled to a negative side of the restricted range, i.e., to a side in which the electric power generation motor functions as an electric power generator, a throttle valve opens to a greater extent in order to generate engine torque corresponding to the motor torque, and there is a risk that sufficient negative pressure will not be achieved. Therefore, in the control described in the abovementioned document, when negative pressure is generated from an electric-power-generating state, the motor torque is controlled to a positive side of the restricted range, i.e., to a side in which the electric power generation motor functions as an electric motor. Accordingly, the internal combustion engine transitions from a firing state of operating by burning fuel to a motoring state of being driven by the torque of the electric power generation motor. As a result, the positivity/negativity of the torque of the electric power generation motor is reversed, and when the meshing of the gears of the gear mechanism changes along with this reversal, gear tooth striking sound occurs.

In view of this, it is an object of the present invention to minimize the occurrence of gear tooth striking sound in the gear mechanism in a hybrid vehicle in which the electric power generation motor and the internal combustion engine are connected via the gear mechanism.

According to one aspect of the present invention, there is provided a method for controlling a hybrid vehicle in which when an internal combustion engine is in a firing state, the hybrid vehicle is controlled such that power is generated by an electric power generation motor connected to the internal combustion engine via a gear mechanism, and assistance is performed using intake negative pressure of the internal combustion engine during brake actuation. In this method for controlling a hybrid vehicle, a control unit sets, as a rotational speed threshold value, an engine rotational speed at which gear tooth striking sound occurring in the gear mechanism in the firing state is not a problem in terms of quality, and when there is a negative pressure generation request in the firing state with the engine rotational speed equal to or greater than the rotational speed threshold value, the control unit generates negative pressure while maintaining the engine rotational speed in the firing state. When there is a negative pressure generation request in the firing state with the engine rotational speed less than the rotational speed threshold value, the control unit generates negative pressure after switching from the firing state to a motoring state, in which the internal combustion engine is caused to rotate by the electric power generation motor, while the engine rotational speed is maintained.

BRIEF DESCRIPTION OF THE DRAWINGS

Referring now to the attached drawings which form a part of this original disclosure.

DETAILED DESCRIPTION OF EMBODIMENTS

Embodiments of the present invention are described below with reference to the drawings.

Figure 1:
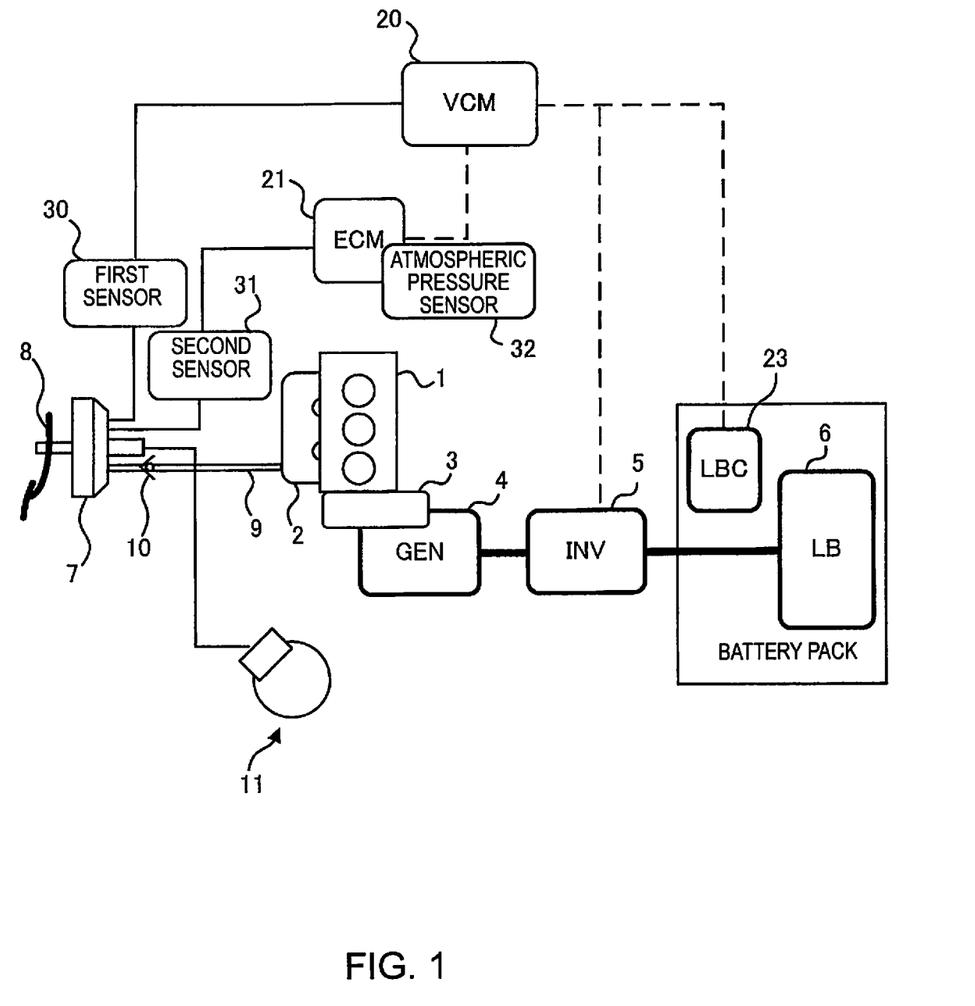
FIG. 1 is a schematic structural view of a system of a hybrid vehicle according to an embodiment of the present invention.

FIG. 1 is a schematic structural view of a system of a hybrid vehicle according to an embodiment of the present invention. The hybrid vehicle of the present embodiment is a "series hybrid vehicle" in which an electric power generation motor 4 is driven by an internal combustion engine 1, a battery 6 is charged by electric power generated by the electric power generation motor 4, and a travel motor (not shown) is driven by the electric power of the battery 6.

The electric power generation motor 4 is mechanically connected to the internal combustion engine 1 via a gear mechanism 3 constituted of a plurality of gears. The gear mechanism 3 is equivalent to a gear mechanism according to the present invention. In addition, the electric power generation motor 4 is electrically connected to the battery 6 via an inverter 5. An electric power supply path may be added which supplies electric power from the electric power generation motor 4 to the travel motor (not shown) without being routed via the battery 6.

When the internal combustion engine 1 is in a state of running by burning fuel (also hereinafter referred to as a firing state), the electric power generation motor 4 generates power. In addition, the electric power generation motor 4 is powered by the electric power of the battery 6, and also has the function of causing the internal combustion engine 1 to rotate. The state in which the internal combustion engine 1 is caused to rotate by the electric power generation motor 4 is referred to as a motoring state.

A fuel injection amount, ignition period, etc., of the internal combustion engine 1 are controlled by an engine controller 21. Amounts by which the battery 6 is charged or discharged are controlled by a battery controller 23. The engine controller 21 and the battery controller 23 are connected to an integrated controller 20 via a controller area network (CAN) such that information can be exchanged. The integrated controller 20 integratedly controls operations of the internal combustion engine 1, the travel motor (not shown), and other elements on the basis of information from the other controllers. The integrated controller 20 is equivalent to a control unit according to the present invention.

A braking system of the hybrid vehicle according to the present embodiment is a publicly known system. When the driver operates a brake pedal 8, a brake pedal depressing force is amplified by a master vac 7, and a brake mechanism 11 is actuated by means of a hydraulic circuit. The master vac 7 is equivalent to a braking force amplification device according to the present invention. The brake mechanism 11 is equivalent to a brake device according to the present invention.

The master vac 7 has a function of amplifying the brake pedal depressing force using the intake negative pressure of the internal combustion engine 1. For this purpose, a negative-pressure pipe 9 for introducing negative pressure from a collector tank 2 of the internal combustion engine 1 is connected to the master vac 7. The negative-pressure pipe 9 is provided with a check valve 10 that opens when the collector tank 2 reaches a lower pressure than the interior of the master vac 7.

The negative pressure of the master vac 7 is detected by two negative pressure sensors: a first sensor 30 and a second sensor 31. The first sensor 30 outputs a detection signal to the integrated controller 20, and the second sensor 31 outputs a detection signal to the engine controller 21. The engine controller 21 receives input of not only the detection signal of the second sensor 31, but also a detection signal of an atmospheric pressure sensor 32 that detects atmospheric pressure outside the vehicle. The engine controller 21 outputs the negative pressure detected by the second sensor 31 and the atmospheric pressure detected by the atmospheric pressure sensor 32 to the integrated controller 20.

The integrated controller 20 assesses whether or not the negative pressure of the master vac 7 is great enough to exert sufficient braking force on the basis of the inputted information, and performs control for negative pressure generation when the negative pressure is insufficient.

The braking system including two negative pressure sensors (the first sensor 30 and the second sensor 31) is for the purpose of system redundancy. Specifically, the purpose is to cause the brake system to function properly even when either the first sensor 30 or the second sensor 31 can no longer detect accurate negative pressure.

The method of generating negative pressure in the present embodiment shall next be described.

In the hybrid vehicle described above, operation points of the internal combustion engine 1, which are determined according to engine torque and engine rotational speed, are basically determined in accordance with a target power generation amount based on a state of charge of the battery 6 and power consumption of the vehicle. For example, when the battery 6 is nearly fully charged and power consumption is low due to the vehicle traveling at a low speed, the result is a low-rotational-speed and low-torque operation point (operation point A1 in FIG. 2). By contrast, when the battery 6 has a low charge amount and power consumption is high due to the vehicle traveling at a high speed or accelerating, the result is a high-rotational-speed and high-torque operation point (operation point C1 in FIG. 2). Due to the state of charge of the battery 6 and the power consumption of the vehicle, there are also cases of an operation point (operation point B1 in FIG. 2) between operation point A1 and operation point C1.

Figure 2:
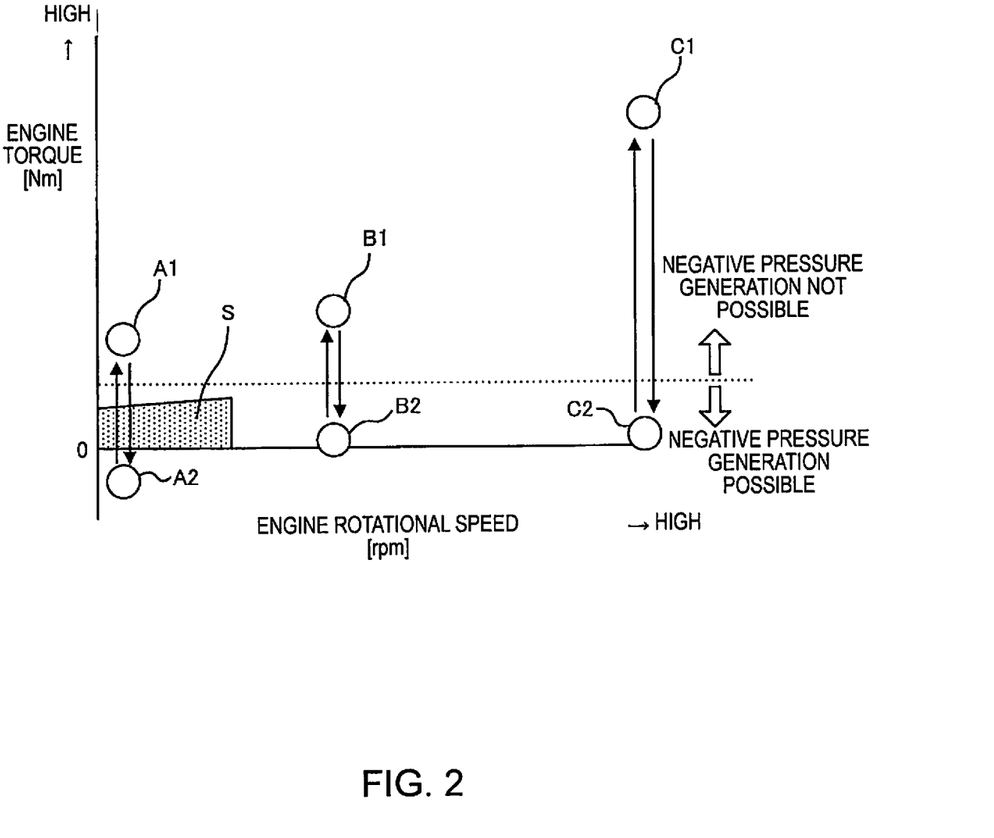
FIG. 2 is a map of operation points of an internal combustion engine.

As described above, when the negative pressure of the master vac 7 is insufficient and negative pressure must be generated, the operation point is switched to an operation point for negative pressure generation. The operation point for negative pressure generation is an operation point at which the throttle position becomes small enough for sufficient negative pressure to develop in the collector tank 2, e.g., an operation point at which an idling state is reached. The idling state mentioned here is a state in which the internal combustion engine 1 generates only sufficient torque needed to overcome its own friction and operate autonomously. A target value of engine torque in the idling state is zero (Nm).

For example, in FIG. 2, when negative pressure is generated from a state in which the internal combustion engine 1 is running at operation point B1, the operation point switches to operation point B2. Similarly, if the engine is running at operation point C1, the operation point switches to operation point C2. During the change from operation point B1 to operation point B2 and the change from operation point C1 to operation point C2, the engine rotational speed does not change, which is to prevent causing discomfort to the driver due to the engine rotational speed changing. Causing the motor torque to decrease in accordance with decreasing of the temperature makes it possible for the engine rotational speed to be maintained at a fixed level.

When the motor torque is caused to decrease, the meshing between gears of the gear mechanism 3 loosens, therefore leading to a problem in which torque fluctuation in the internal combustion engine 1 is transmitted to an input shaft of the gear mechanism 3, whereby meshing parts of the gears collide with each other during backlash, causing continuous gear tooth striking sound and other unusual sounds. Continuous gear tooth striking sound can be absorbed to a certain extent by providing a damper mechanism between the internal combustion engine 1 and the input shaft of the gear mechanism 3 to absorb the transmitted torque fluctuation, but a region where this noise cannot be minimized (e.g., region S in FIG. 2) will remain in the low-rotational-speed region.

In view of this, to prevent continuous gear tooth striking sound, an operation point of the internal combustion engine 1 is not provided in region S. Doing so makes it impossible for there to be an operation point in an idling state when negative pressure is generated from a state in which the engine is running at operation point A1 in FIG. 2. In this case, negative pressure is generated if the internal combustion engine 1 is put into the motoring state (operation point A2 in FIG. 2).

The negative pressure generation control mentioned above shall be described in detail.

Figure 3:
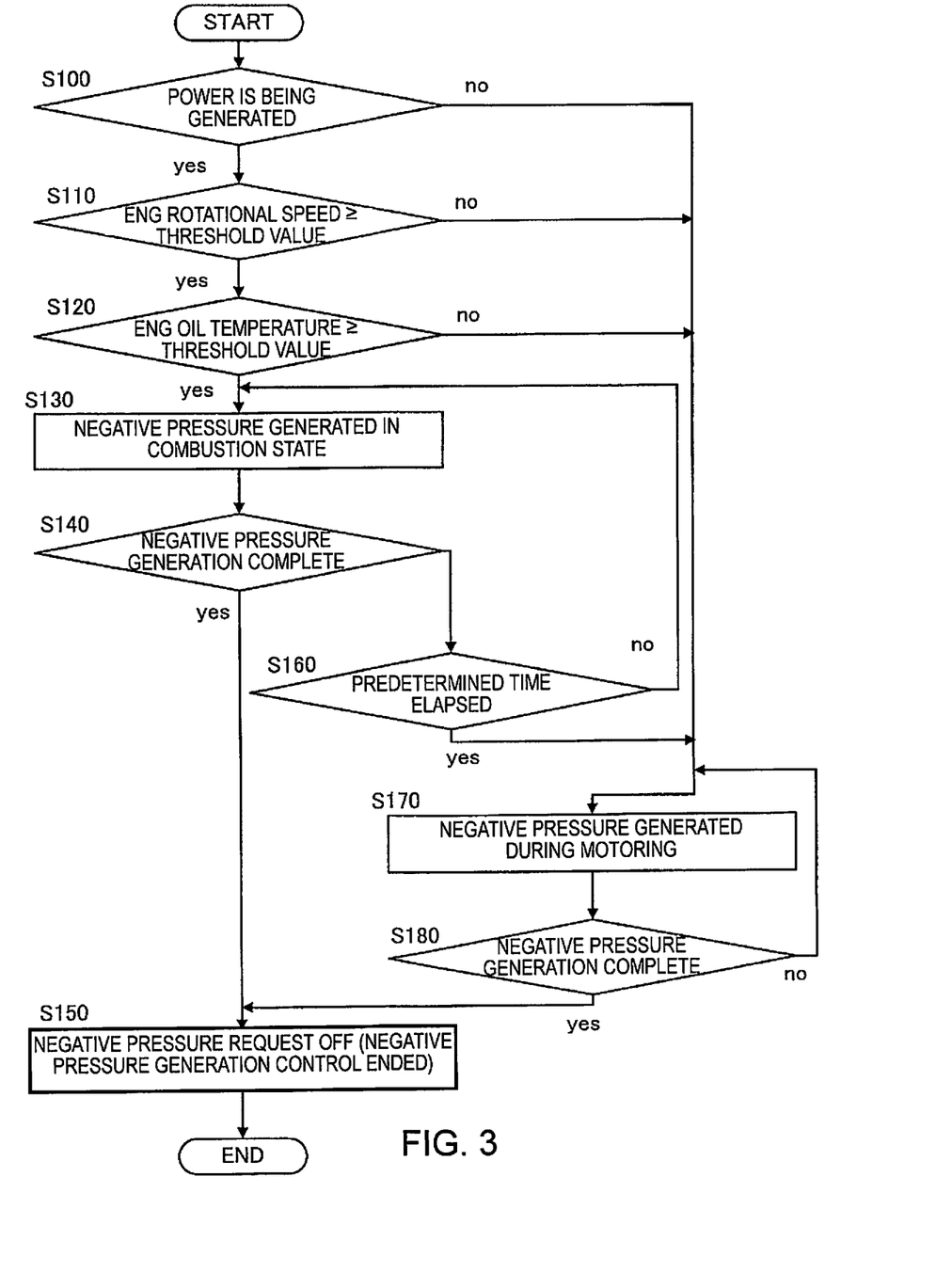
FIG. 3 is a flowchart of a control routine for negative pressure generation.

The integrated controller 20 executes a control routine shown in FIG. 3 when there is a negative pressure generation request. The negative pressure generation request shall first be described with reference to FIG. 4.

Figure 4:
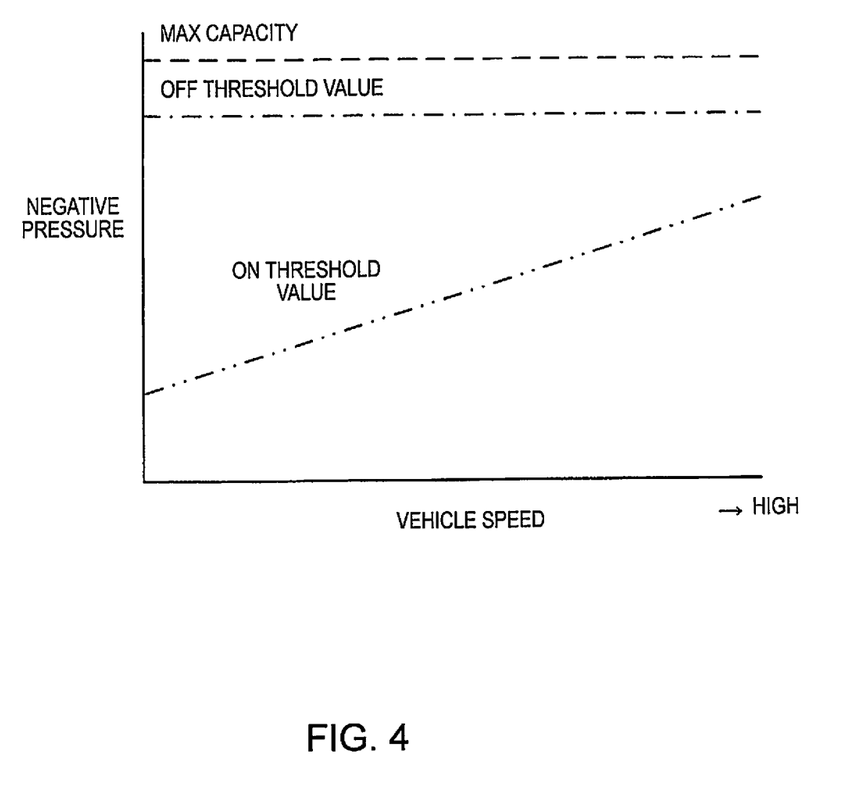
FIG. 4 is a graph of a relationship between vehicle speed and master vac negative pressure.

FIG. 4 is a graph of a relationship between vehicle speed and the negative pressure of the master vac 7 at which braking force needed to stop the vehicle is achieved (also referred to as the necessary negative pressure). The vertical axis represents negative pressure, and great negative pressure means that the absolute value of pressure is high. MAX capacity indicated by a dashed line in the graph indicates the maximum negative pressure that can be accumulated in the master vac 7.

The necessary negative pressure changes in accordance with vehicle speed. In view of this, as shown by the two-point dashed line in the graph, an ON threshold value corresponding to vehicle speed is set, and the integrated controller 20 sends out a negative pressure generation request when the negative pressure of the master vac 7 falls below the ON threshold value.

The control routine of FIG. 3 shall next be described.

FIG. 3 is a flowchart of a control routine executed by the integrated controller 20 when there is a negative pressure generation request.

In step S100, the integrated controller 20 determines whether or not the electric power generation motor 4 is generating power. Specifically, it is assessed that power is being generated if the internal combustion engine 1 is in the firing state, and it is assessed that power is being not generated if the internal combustion engine 1 is in a stopped state or the motoring state. When it is assessed that power is being generated, the process of step S110 is executed, otherwise the process of step S170 is executed.

In step S170, the integrated controller 20 stops the internal combustion engine 1 and powers the electric power generation motor 4, thereby generating negative pressure in the motoring state.

In step S110, the integrated controller 20 determines whether or not the engine rotational speed is equal to or greater than a rotational speed threshold value (described hereinafter), executes the process of step S120 if the engine rotational speed is equal to or greater than the rotational speed threshold value, and otherwise executes the process of step S170.

The rotational speed threshold value is a value set in advance, and is an engine rotational speed at which continuous gear tooth striking sound occurring in the gear mechanism 3 in the firing state is not a problem in terms of vehicle quality. The phrase "not a problem in terms of quality" includes situations in which continuous gear tooth striking sound does not occur, as is evident, and situations in which continuous gear tooth striking sound occurs but is not heard by the occupants due to being drowned out by the operating noise of the internal combustion engine. In a vehicle equipped with the internal combustion engine 1, the operating noise of the internal combustion engine 1 is naturally audible and the occupants of the vehicle do not experience any discomfort with the operating noise of the internal combustion engine 1. Therefore, if the operating noise of the internal combustion engine 1 is louder than the continuous gear tooth striking sound, the occupants will not experience discomfort even if continuous gear tooth striking sound occurs.

Figure 5:
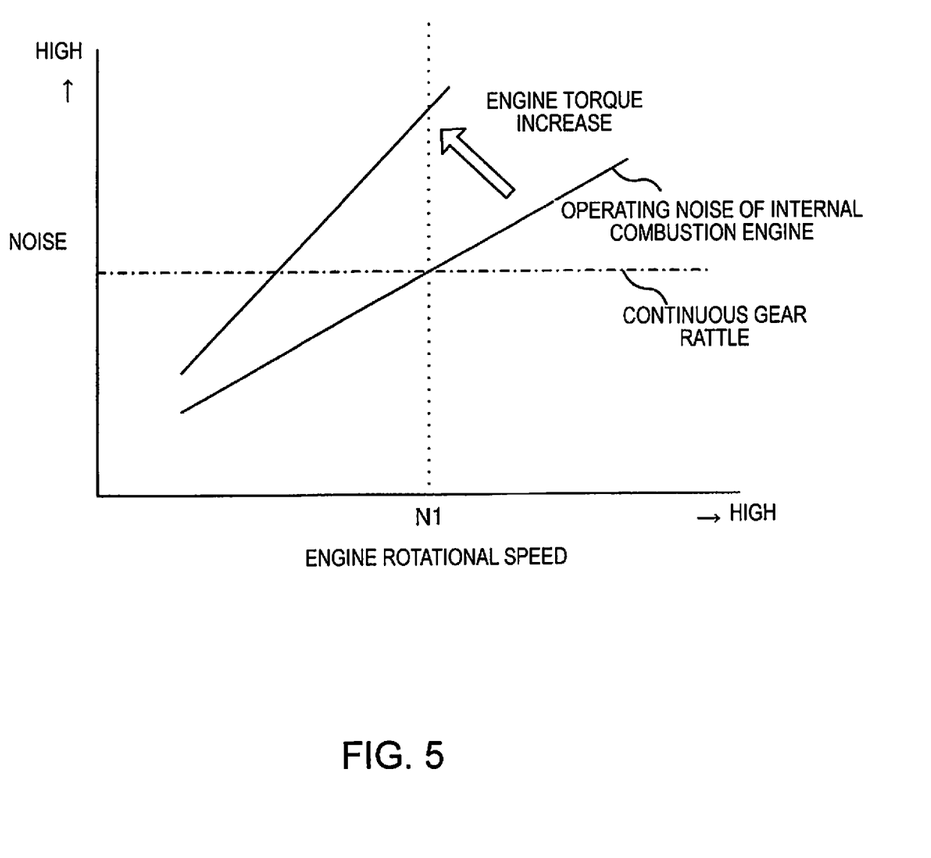
FIG. 5 is a graph of a relationship between noise heard by occupants and engine rotational speed.

The method for setting the rotational speed threshold value shall now be described. The continuous gear tooth striking sound and the operating noise of the internal combustion engine 1 have a relationship such as is shown in FIG. 5. In FIG. 5, the vertical axis represents noise heard by the occupants, which includes continuous gear tooth striking sound and the operating noise of the internal combustion engine 1, and the horizontal axis represents engine rotational speed.

As shown in the graph, continuous gear tooth striking sound remains mostly constant regardless of engine rotational speed, whereas the operating noise of the internal combustion engine 1 grows louder as the engine rotational speed increases. As described above, there is no problem in terms of quality if the operating noise of the internal combustion engine 1 is louder than the continuous gear tooth striking sound, and the rotational speed threshold value is N1, which is the engine rotational speed at a point where the operating noise of the internal combustion engine 1 and the continuous gear tooth striking sound intersect.

As shown in FIG. 5, the operating noise of the internal combustion engine 1 grows louder if the engine torque increases even if the engine rotational speed remains the same. In other words, the rotational speed threshold value can be lowered as the engine torque increases. However, the target value of the engine torque is zero (Nm) or a value near zero when negative pressure is generated, and the engine torque during negative pressure generation is therefore used to set the rotational speed threshold value.

As described above, the rotational speed threshold value is a minimum value of the engine rotational speed at which the operating noise of the internal combustion engine 1 will be louder than the continuous gear tooth striking sound in the passenger cabin.

Because continuous gear tooth striking sound occurs due to gears colliding with each other, a case accommodating the gears vibrates when continuous gear tooth striking sound occurs. This case also vibrates as a result of torque fluctuation in the internal combustion engine 1 transmitted via the input shaft. In view of this, for example, an acceleration pickup can be installed in the case to detect amplitude of the vibration of the case when the internal combustion engine 1 is in the firing state, and the engine rotational speed when the detected vibration amplitude falls below a target value can be set as the rotational speed threshold value. The target value mentioned here is the vibration amplitude at the minimum engine rotational speed at which the operating noise of the internal combustion engine is louder than the continuous gear tooth striking sound.

Description of the flowchart shall be resumed.

In step S120, the integrated controller 20 determines whether or not an engine oil temperature detected by an oil temperature sensor (not shown) is equal to or greater than an oil temperature threshold value, executes the process of step S130 if the oil temperature is equal to or greater than the oil temperature threshold value, and otherwise executes the process of step S170. A determination using the engine oil temperature is performed for the following reasons.

Friction in the internal combustion engine 1 increases when the engine oil temperature is low, and it is therefore necessary to increase the throttle valve position as compared with that during normal temperature in order to maintain the engine torque at zero (Nm). However, negative pressure (i.e., intake negative pressure) in the collector tank 2 does not develop when the throttle valve position is increased, the master vac 7 will therefore be unable to accumulate the target negative pressure. Inasmuch, a determination using the engine oil temperature is performed as one determination of whether or not the master vac 7 is able to accumulate the target negative pressure.

The oil temperature threshold value is a lower limit value of the engine oil temperature at which the internal combustion engine 1 can autonomously operate at an engine torque of zero (Nm) and with a throttle valve position such that the master vac 7 is able to accumulate the target negative pressure. The specific value differs depending on the specifications of the internal combustion engine 1 and the specifications of the engine oil used, but the value is commonly a temperature referred to as a low oil temperature, e.g., near zero [° C.].

In step S130, the integrated controller 20 starts negative pressure generation during the firing state. For example, if the engine had been running at operation point B1 in FIG. 2, the operation point is switched to operation point B2. Specifically, the engine torque of the internal combustion engine 1 is brought to zero (Nm), and the throttle valve is closed accordingly. At this time, the engine rotational speed of the internal combustion engine 1 can be maintained at a constant value by controlling the motor torque of the electric power generation motor 4 in accordance with decrease in torque of the internal combustion engine 1. In the hybrid system of the present embodiment, the engine rotational speed of the internal combustion engine 1 depends not on the engine torque but on the motor torque of the electric power generation motor 4. In other words, the internal combustion engine 1 is merely controlled so as to generate engine torque, and the magnitude of the motor torque of the electric power generation motor 4 is controlled in accordance with the generated engine torque, whereby the desired engine rotational speed is achieved.

In step S140, the integrated controller 20 assesses whether or not negative pressure generation is complete, i.e., whether or not the master vac 7 has accumulated the target negative pressure. If so, the process of step S150 is executed, and if not, the process of step S160 is executed.

Negative pressure generation being complete means that the negative pressure of the master vac 7 has reached an OFF threshold value in FIG. 4. The OFF threshold value is, for example, set to a negative pressure that can allow for several brake operations in a low-speed range.

In step S150, the integrated controller 20 cancels the negative pressure generation request to end negative pressure generation control. The ending of negative pressure generation control allows the firing state to continue unchanged when negative pressure has been generated in the firing state. When negative pressure has been generated in the motoring state, a switch to the firing state is made.

In step S160, the integrated controller 20 assesses whether or not a predetermined time (described hereinafter) has elapsed after the start of negative pressure generation, executes the process of step S170 when the predetermined time has elapsed, and returns to the process of step S130 when the predetermined time has not elapsed. The predetermined time is equivalent to a limit time according to the present invention. The assessment in this step is performed for the following reasons.

Figure 6:
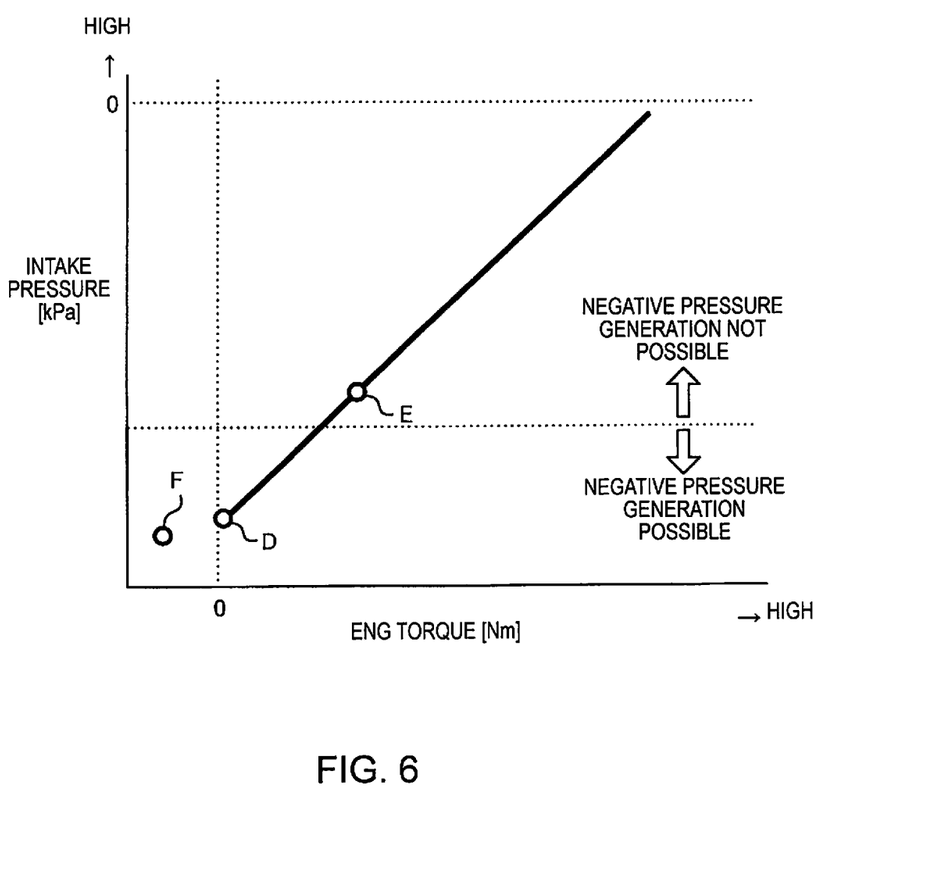
FIG. 6 is a graph of a relationship between generatable intake pressure and engine torque.

Generally, in the controlling of an internal combustion engine, learning of a throttle valve position and correction based on this learning are performed so as to match up a command value and an actual value for engine torque. Therefore, the throttle valve position in an idling state (a state in which the target value of engine torque is zero (Nm)) is sometimes corrected so as to increase, and as a result, there is a risk that the master vac 7 will be unable to accumulate the target negative pressure even if the target value of engine torque is set to zero (Nm). For example, in FIG. 6, which shows a relationship between generatable intake pressure and engine torque, although the operation point in an idling state before learning had been operation point D at which the target negative pressure can be generated, the operation point will sometimes change to operation point E due to the throttle valve position being corrected in a direction of increasing. The intake pressure at operation point E is a negative pressure but is insufficient to generate a target intake negative pressure. In other words, no matter how much time is taken, the target negative pressure cannot be accumulated in the state of operation point E.

In view of this, an assessment using a predetermined time is performed, and a switch is made to negative pressure generation in the motoring state (operation point F in FIG. 6) when negative pressure generation is not complete even after the elapse of the predetermined time. This is because if the internal combustion engine 1 is already in the motoring state, the engine stops, the throttle valve fully closes despite the learning state, and negative pressure generation becomes possible.

The predetermined time is a combined total of the time needed to reach the target negative pressure (also referred to as the necessary time) and a margin time considering the possibility that a "harmful operation" has been performed when the internal combustion engine 1 is in a state that enables the target negative pressure to be generated.

The necessary time can be calculated from a capacity of the master vac 7 and a negative pressure generation speed. The negative pressure generation speed is determined according to an orifice diameter in the check valve 10; with the master vac 7 and the check valve 10 used in the present embodiment, the target negative pressure is reached in about 3-10 seconds regardless of the differential pressure, altitude, and state of the internal combustion engine 1 at the initial stage of negative pressure generation. Inasmuch, the necessary time is set to 3-10 seconds in the present embodiment.

The "harmful operation" is, for example, continuous operation of the brake, and if the brake is continuously operated, more time is needed to reach the target negative pressure even if the braking system and the throttle valve are normal. In view of this, a margin time (e.g., 3-10 seconds) is provided. Therefore, the predetermined time would be 6-20 seconds in the present embodiment. As shall be apparent, the necessary time and the margin time may be set to different times from those given.

There are also cases in which the throttle valve position deviates from the target value for reasons other than the above-described learning, such as, for example, the throttle valve being stuck. In such cases, a switch is made to the motoring state in accordance with the assessment result of this step.

Having executed the process of step S170, the integrated controller 20 advances to step S180, assesses whether or not negative pressure generation is complete as in step S140, executes the process of step S150 when negative pressure generation is complete, and returns to the process of step S170 when negative pressure generation is not complete.

Figure 7:
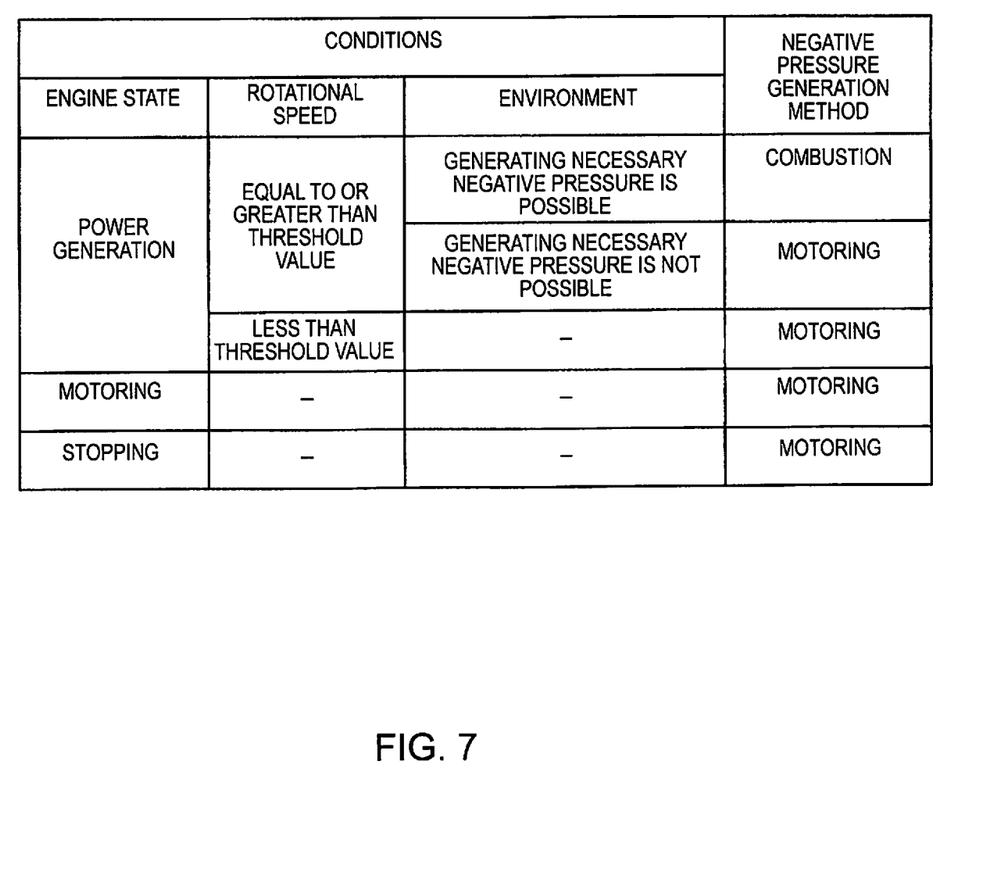
FIG. 7 is a table summarizing the negative pressure generation method in the embodiment.

FIG. 7 is a table summarizing the negative pressure generation method of the present embodiment according to the control routine described above.

When a negative pressure generation request has been issued, if the internal combustion engine 1 is in the motoring state or a stopped state, the internal combustion engine 1 is brought to the motoring state and negative pressure is generated (steps S100 and S170 in FIG. 3).

When a negative pressure generation request has been issued, if the internal combustion engine 1 is in the firing state, i.e., an electric-power-generating state, with a rotational speed less than the threshold value, the internal combustion engine 1 is brought to the motoring state and negative pressure is generated (steps S110 and S170 in FIG. 3).

When a negative pressure generation request has been issued, and the internal combustion engine 1 is in the firing state, i.e., an electric power-generating state, with a rotational speed equal to or greater than the threshold value, whether or not the target negative pressure can be generated is assessed while the engine remains in an electric-power-generating state. When it is assessed that the target negative pressure can be generated while the engine remains in an electric-power-generating state, negative pressure generation is performed while the engine rotational speed is maintained at a constant speed in an electric-power-generating state (steps S120 and S130 in FIG. 3). When it is assessed that the target negative pressure cannot be generated in an electric-power-generating state, negative pressure generation is performed by switching to the motoring state (steps S120 and S170 in FIG. 3).

(Modification)

A modification of the present embodiment shall next be described. The present modification also falls under the technical scope of the present invention.

In the control routine described above, the engine oil temperature is used to assess whether or not the target negative pressure can be generated while the engine is in the firing state (step S120 in FIG. 3). By contrast, in the present modification, this assessment is made on the basis of the engine oil temperature and the atmospheric pressure detected by the atmospheric pressure sensor 32.

The reason for using the atmospheric pressure as a parameter is as follows.

Figure 8:
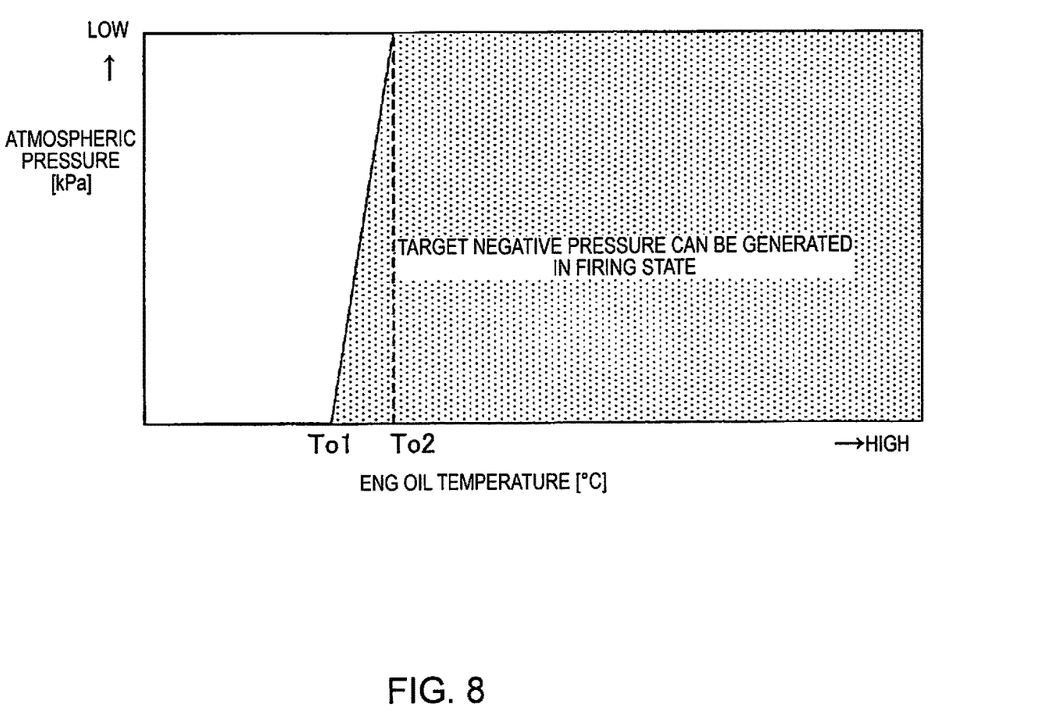
FIG. 8 is a map of an oil temperature threshold value.

Atmospheric pressure decreases as altitude increases. The intake negative pressure develops less readily as the atmospheric pressure decreases. Specifically, even if the engine oil temperature, the throttle valve position, and other conditions remain the same, it becomes more difficult for the master vac 7 to accumulate negative pressure as the atmospheric pressure decreases. Inasmuch, as shown in FIG. 8, a map is created in advance in which the oil temperature threshold value is set higher as the atmospheric pressure decreases, this map is stored in the integrated controller 20, and an assessment is made as to whether or not the operating point determined according to the detected engine oil temperature and atmospheric pressure is in a region in which the target negative pressure can be generated while the engine is in the firing state.

When this assessment is made on the basis of oil temperature alone, there must be set an oil temperature threshold value that can correspond to all conditions from level ground to high ground, and an oil temperature (To2 in FIG. 8) corresponding to high ground with more severe conditions is therefore set as the oil temperature threshold value. By contrast, if an oil temperature threshold value corresponding to atmospheric pressure is set as in the present modification, To1, which is a lower temperature than To2 at level ground, can be set as the oil temperature threshold value. Specifically, according to the present modification, the region in which negative pressure can be generated in the firing state is greater as compared with making the assessment on the basis of oil temperature alone.

The operative effects of the present embodiment shall next be described with reference to FIG. 9-11.

Figure 9:
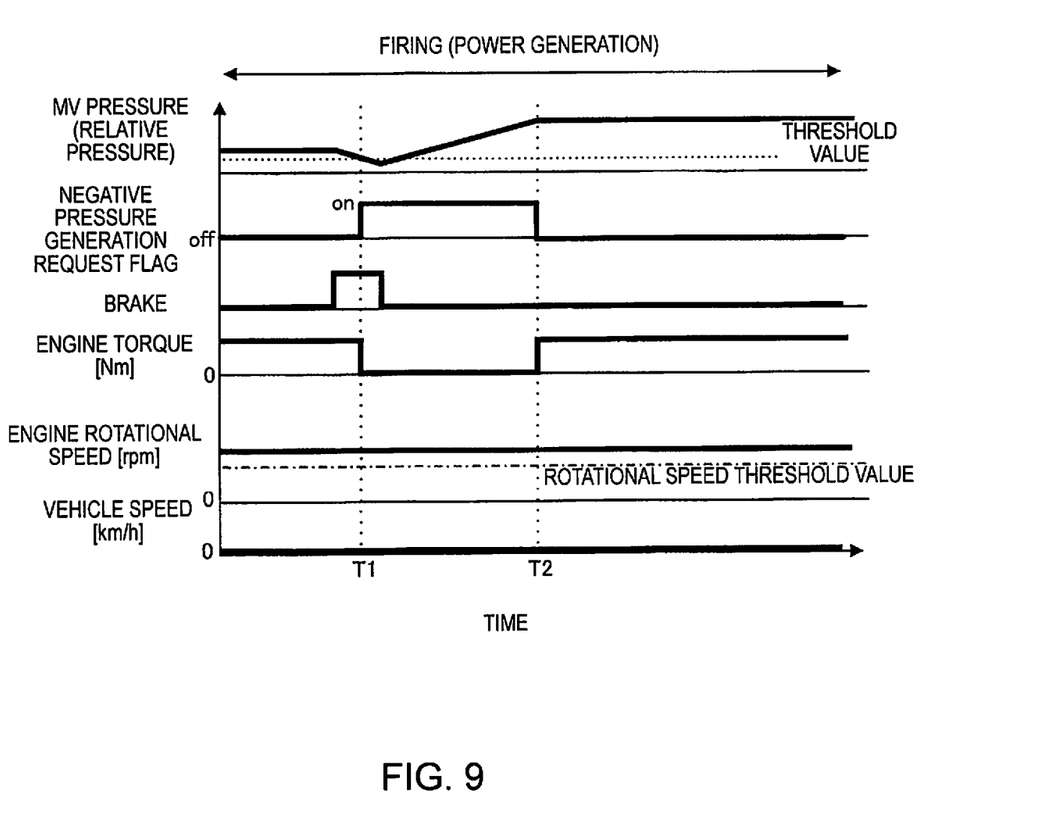
FIG. 9 is a timing chart of a case in which negative pressure generation is performed in a firing state by using control according to the embodiment.
Figure 10:
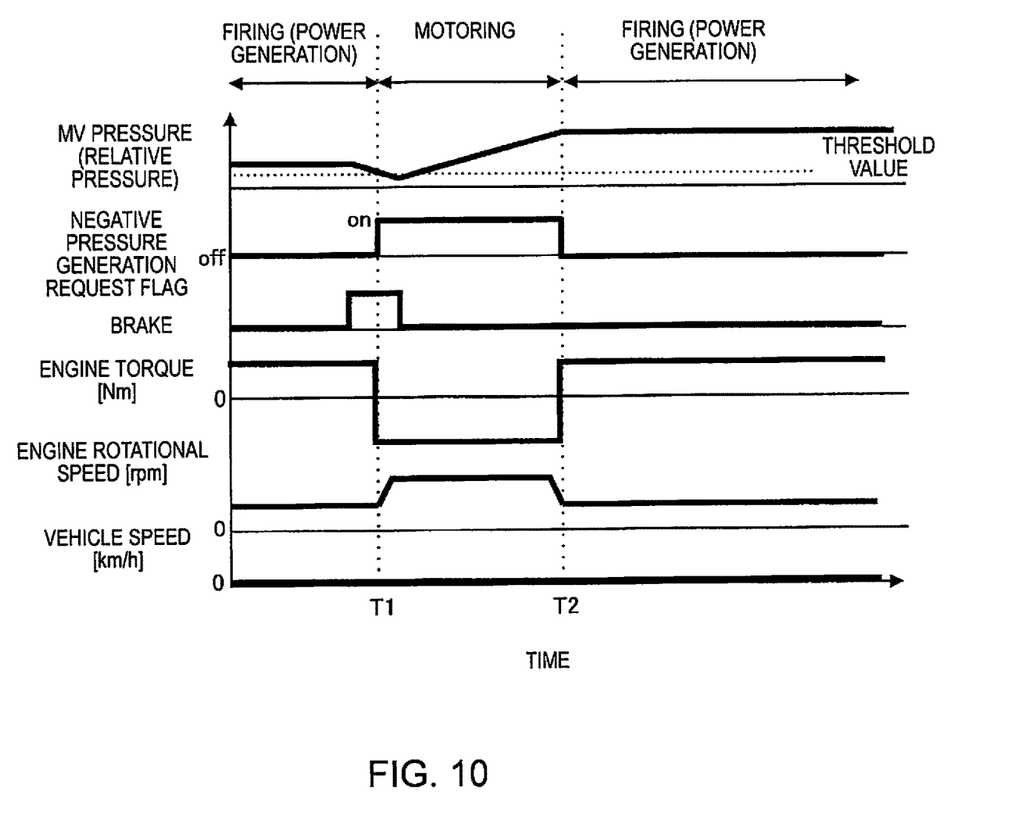
FIG. 10 is a timing chart of a case in which, as a comparative example, negative pressure generation is performed after a switch from the firing state to a motoring state.

FIG. 9 is a timing chart of a case in which a negative pressure generation request is issued while the engine is in the firing state at an engine rotational speed equal to or greater than the rotational speed threshold value, and negative pressure generation is performed in the firing state by using the control of the present embodiment. FIG. 10 is a timing chart of a case in which a negative pressure generation request is issued while the engine is in the firing state at an engine rotational speed equal to or greater than the rotational speed threshold value, and negative pressure generation is performed after a switch to the motoring state. FIG. 11 is a timing chart of a case in which a negative pressure generation request is issued while the engine is in the firing state at an engine rotational speed less than the rotational speed threshold value, and negative pressure generation is performed after a switch to the motoring state by using the control of the present embodiment. In all of these timing charts, the vehicle has stopped (i.e., vehicle speed=0 km/h) and the engine oil temperature is equal to or greater than the oil temperature threshold value.

First, FIG. 9 shall be described. When a brake operation is performed in the firing state with the engine rotational speed equal to or greater than the rotational speed threshold value, the master vac pressure ("MV pressure" in the chart) decreases. The master vac pressure in this case is the relative pressure of the master vac negative pressure in relation to the atmospheric pressure, and the value on the timing chart decreases as the negative pressure in the master vac 7 approaches the atmospheric pressure.

The master vac pressure decreases, and a negative pressure generation request flag is raised (i.e., a negative pressure generation request is issued) at timing T1 at which the master vac pressure falls below a threshold value.

When a negative pressure generation request is issued, the throttle valve is closed and the engine torque of the internal combustion engine 1 therefore begins to decrease. At this time, the engine rotational speed is maintained at a constant speed. This is because, as described above, the motor torque of the electric power generation motor 4 is also caused to decrease in accordance with the decrease in engine torque.

After timing T2 at which negative pressure generation is complete, the engine torque returns to the magnitude that preceded timing T1. In FIG. 9, the engine torque changes in stepwise fashion at timings T1 and T2, but there are also cases in which there is a delay in the actual torque change with respect to a command to change the engine torque.

As described above, in the timing chart of FIG. 9, the engine rotational speed remains constant in all time periods including before the start of negative pressure generation, during negative pressure generation, and after the completion of negative pressure generation, and the occupants therefore do not experience discomfort. In addition, there is no switching between main rotation and driven rotation of the gears of the gear mechanism 3, because negative pressure is generated while the engine remains in the firing state. Therefore, there are no discontinuous instances of gear tooth striking sound.

A reference example not included in the scope of the present embodiment shall be described with reference to FIG. 10. In a case in which a switch is made from the firing state to the motoring state in order to generate negative pressure as in FIG. 10, when there is a negative pressure generation request at timing T1, the engine torque becomes negative, and due to motoring, the engine rotational speed increases to the engine rotational speed needed to generate negative pressure. The engine is then switched back to the firing state at timing T2 at which negative pressure generation is complete, and the engine rotational speed decreases to an engine rotational speed needed for power generation. When the engine rotational speed fluctuates in this manner, the occupants will experience discomfort.

Even in the present embodiment, when the engine rotational speed is less than the rotational speed threshold value, a switch is made to the motoring state in order to generate negative pressure. However, as shown in FIG. 11, in the present embodiment, at the time of a switch from the firing state to the motoring state, the engine torque and the motor torque of the electric power generation motor 4 are controlled so that the engine rotational speed does not change.

Figure 11:
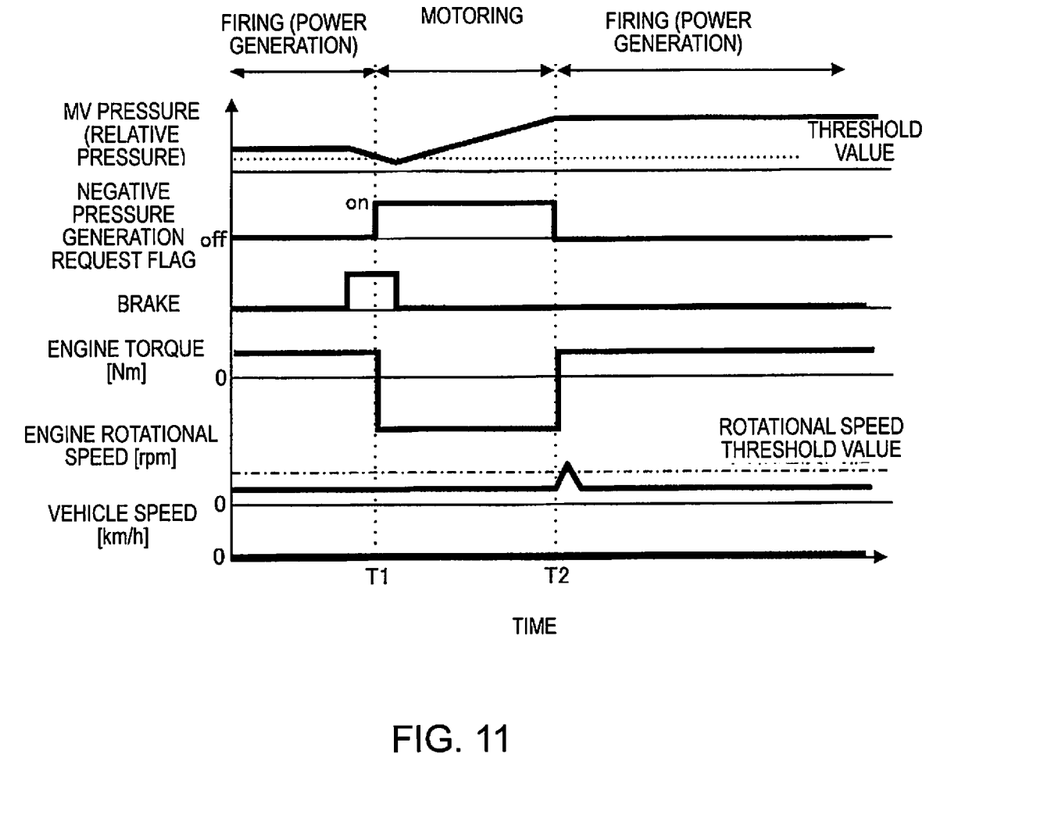
FIG. 11 is a timing chart of a case in which negative pressure generation is performed after a switch from the firing state to the motoring state by using the control according to the embodiment.

As shown in FIG. 11, the engine rotational speed spikes immediately after timing T2, at which the engine is switched from the motoring state to the firing state. This is to prevent the occurrence of discontinuous instances of gear tooth striking sound at the time of the switch from the motoring state, in which a gear on the electric power generation motor side is undergoing main rotation and a gear on the input shaft side is undergoing driven rotation, to the firing state, in which the gear on the input shaft side is undergoing main rotation and the gear on the electric power generation motor side is undergoing driven rotation.

Control of engine rotational speed for preventing the occurrence of discontinuous instances of is publicly known in JP 2018-17212 A, and a simple description of such control is therefore given here.

The switching of functions between meshing gears in terms of the main gear becoming the driven gear and vice versa results in discontinuous instances of gear tooth striking sound, which are due to collisions between gears for which backlash in the meshing parts has closed up in the opposite direction to the previous direction. In other words, discontinuous instances of gear tooth striking sound occur from collisions between gears of meshing parts when a switch is made from a state in which the backlash had been closed up as a result of the gear on the input shaft side being pushed by the gear on the electrical-power-generating-motor 4 side, to a state in which the gear on the electrical-power-generating-motor 4 side is pushed by the gear on the input shaft side due to torque being generated by the internal combustion engine 1.

Inasmuch, when the engine rotational speed is increased by motoring to a predetermined rotational speed, the contact surfaces of the meshing parts are switched so that no gear tooth striking sound occurs, and the engine rotational speed is reduced by motoring. The internal combustion engine 1 is then started while the engine rotational speed is reduced. The backlash will, thereby, already be closed in the opposite direction to that in the motoring state when the internal combustion engine 1 starts, and thus no gear tooth striking sound will occur when switching to the firing state.

However, the engine rotational speed is lowered by the electric power generation motor 4 when the contact surfaces of the gears are changed in the motoring state, and the starting of the internal combustion engine 1 also causes the engine rotational speed to decrease; therefore, a drop in engine rotational speed must be ensured in order to avoid an engine stall immediately after startup. Thus, to ensure a drop, the engine rotational speed is controlled so as to be briefly higher than a target engine rotational speed in the firing state.

In the present embodiment, as described above, there is provided a hybrid vehicle control method in which when the internal combustion engine 1 is in a firing state, the hybrid vehicle is controlled such that power is generated by the electric power generation motor 4 connected to the internal combustion engine 1 via a gear mechanism 3, and assistance is performed using intake negative pressure of the internal combustion engine 1 during brake actuation. In this control method, the integrated controller 20 sets, as a rotational speed threshold value, an engine rotational speed at which gear tooth striking sound occurring in the gear mechanism 3 in the firing state is not a problem in terms of vehicle quality, and when there is a negative pressure generation request in the firing state with the engine rotational speed equal to or greater than the rotational speed threshold value, the integrated controller 20 generates negative pressure while maintaining the engine rotational speed in the firing state. When there is a negative pressure generation request in the firing state with the engine rotational speed less than the rotational speed threshold value, the integrated controller 20 generates negative pressure by switching from the firing state to a motoring state, in which the internal combustion engine is caused to rotate by the electric power generation motor. Due to this configuration, when the engine rotational speed is equal to or greater than the rotational speed threshold value, continuous gear tooth striking sound does not occur because of the negative pressure generation, and the occupants do not experience discomfort. Even when the engine rotational speed is less than the rotational speed threshold value, the occupants do not experience discomfort because the occurrence of continuous gear tooth striking sound is minimized due to the engine being placed in the motoring state.

In the present embodiment, when generating negative pressure in the firing state, the integrated controller 20 controls the torque of the internal combustion engine 1 to torque equivalent to friction in the internal combustion engine 1. A target negative pressure can thereby be quickly achieved.

In the present embodiment, when generating negative pressure in the firing state, the integrated controller 20 switches to the motoring state to generate negative pressure when the target negative pressure is not achieved even after a limit time set in advance has elapsed. As a result, there will not be any situations in which the target negative pressure is never achieved.

In the present embodiment, when the engine oil temperature is lower than an oil temperature threshold value set in advance, the integrated controller 20 switches to the motoring state to generate negative pressure even when the engine is in the firing state in which the engine rotational speed is equal to or greater than the rotational speed threshold value. When the oil temperature is low, the throttle position for maintaining the engine torque at zero (Nm) increases as friction increases. Therefore, it is difficult to generate the target negative pressure. However, according to the present embodiment, the target negative pressure can be generated by switching to the motoring state, in which the throttle position can be narrowed regardless of the engine oil temperature.

In the present embodiment, the oil temperature threshold value is set so as to increase as atmospheric pressure decreases. As atmospheric pressure decreases, engine torque at the same throttle valve position decreases. Specifically, as atmospheric pressure decreases, the throttle position for maintaining the engine torque at zero (Nm) increases and it becomes more difficult to generate the target negative pressure. Setting the oil temperature threshold value so as to increase as atmospheric pressure decreases, as in the present embodiment, makes it possible to set a more accurate oil temperature threshold value.

Embodiments of the present invention were described above, but this embodiment merely presents part of an example to which the present invention is applied, and the technical scope of the present invention is not meant to be limited to the specific configuration of the above embodiment.

The invention claimed is:

1. A hybrid vehicle control method for controlling a hybrid vehicle using a control unit in which when an internal combustion engine is in a firing state, power is generated by an electric power generation motor connected to the internal combustion engine via a gear mechanism, and a brake pedal depressing force is amplified using intake negative pressure of the internal combustion engine during brake actuation, the hybrid vehicle control method comprising:
   setting a rotational speed threshold value as an engine rotational speed at which a continuous gear tooth striking sound does not occur in the gear mechanism or at which an operating noise of the internal combustion engine is louder than the continuous gear tooth striking sound occurring in the gear mechanism in the firing state;
   generating a negative pressure while maintaining the engine rotational speed when a negative pressure generation request exists in the firing state and the engine rotational speed is equal to or greater than the rotational speed threshold value; and
   generating the negative pressure after switching from the firing state to a motoring state when the negative pressure generation request exists in the firing state and the engine rotational speed is less than the rotational speed threshold value, the motoring state being a state in which the internal combustion engine is rotated by the electric power generation motor.

2. The hybrid vehicle control method according to claim 1, further comprising
   using the control unit to control a torque of the internal combustion engine to a torque equivalent to friction in the internal combustion engine when the negative pressure is generated in the firing state.

3. The hybrid vehicle control method according to claim 1, further comprising:
   using the control unit to switch to the motoring state to generate the negative pressure when the negative pressure is generated in the firing state and a target negative pressure is not achieved even after a limit time set in advance has elapsed.

4. The hybrid vehicle control method according to claim 1, further comprising:
   using the control unit to switch to the motoring state to generate the negative pressure even if the engine had been in the firing state with the engine rotational speed equal to or greater than the rotational speed threshold value when an engine oil temperature is lower than an oil temperature threshold value set in advance.

5. The hybrid vehicle control method according to claim 4, further comprising:
   setting the oil temperature threshold value to increase as an atmospheric pressure decreases.

6. The hybrid vehicle control method according to claim 1, wherein
   the engine rotational speed at which the operating noise of the internal combustion engine is louder than the continuous gear tooth striking sound is determined with respect to a passenger cabin of the hybrid vehicle.

7. A hybrid vehicle control device for controlling a hybrid vehicle, the hybrid vehicle control device comprising:
   an internal combustion engine;
   an electric power generation motor connected to the internal combustion engine via a gear mechanism to generate power when the internal combustion engine is in a firing state;
   a braking force amplification device configured to amplify brake pedal depressing force using an intake negative pressure of the internal combustion engine; and
   a control unit configured to control the internal combustion engine and the electric power generation motor,
   the control unit being programmed to;
   set a rotational speed threshold value as an engine rotational speed at which a continuous gear tooth striking sound occurring in the gear mechanism does not occur in the gear mechanism or at which an operating noise of the internal combustion engine is louder than the continuous gear tooth striking sound in the firing state,
   generate a negative pressure while maintaining the engine rotational speed when a negative pressure generation request exists in the firing state and the engine rotational speed is equal to or greater than the rotational speed threshold value, and
   generate the negative pressure after switching from the firing state to a motoring state when the negative pressure generation request exists in the firing state and the engine rotational speed is less than the rotational speed threshold value, the motoring state being a state in which the internal combustion engine is rotated by the electric power generation motor.

* * * * *